United States Patent Office 3,584,055
Patented June 8, 1971

3,584,055
PRODUCTION OF BUTYRALDEHYDES AND BUTANOLS WITH A HIGH PROPORTION OF LINEAR COMPOUNDS
Hans Nienburg, Friedrich-Franz Wiese, and Karl Eichner, Ludwigshafen (Rhine), and Ludwig Vogel, Frankenthal, Pfalz, Germany, assignors to Badische Anilin- & Soda-Fabrik Aktiengesellschaft, Ludwigshafen (Rhine), Germany
No Drawing. Filed June 13, 1967, Ser. No. 645,608
Claims priority, application Germany, June 18, 1966, P 12 83 219.8–42
Int. Cl. C07c 45/08
U.S. Cl. 260—604    7 Claims

ABSTRACT OF THE DISCLOSURE

The production of butyraldehydes and butanols with a predominant proportion of straight-chain compounds by the oxo process in two successive reaction stages, a higher temperature prevailing in the second stage than in the first stage and a temperature which is uniform over the entire stage being maintained at least in the first stage. Butyraldehyde may be used for the production of 2-ethylhexanol.

---

This invention relates to a process for the production of mainly linear butyraldehyde and butanol by the oxo process in two successive reaction stages.

It is known from British patent specification No. 903,589 that a higher proportion of linear compounds is obtained when the oxo reaction is carried out at temperatures of only 110° to 130° C. It is a disadvantage however that at these low temperatures relatively low conversions are achieved. A higher proportion of linear hydroformylation products is obtained according to the process of British patent specification No. 1,045,679 by using high pressures, for example 500 to 1200 atmospheres gauge. The use of such high pressures however necessitates disproportionately large expenditure for equipment. Furthermore it is stated in U.S. patent specification No. 2,694,735 that the oxo reaction with propylene proceeds in favor of linear products when it is carried out in the presence of ketones. This requires however an additional stage for the recovery of the ketones during the working up of the product. According to a process described in U.S. patent specification No. 3,278,612, it is possible to increase the proportion of linear butyraldehyde and linear butanol by using as a catalyst a mixture of cobalt carbonyl and tertiary phosphines. The process gives mainly alcohols and not aldehydes because the catalysts containing phosphines have a marked hydrogenating action.

Moreover it is known from U.S. patent specification No. 2,750,419 that the oxo reaction may be carried out in two successive reaction stages, the temperatures prevailing being lower in the first stage and higher in the second stage but not being uniform over the reaction chamber. The purpose of this is to impart to the reaction mixture a temperature which is adequate for the subsequent removal of cobalt. It is however not possible in this way to increase the normal-$C_4$ content when using propylene.

Finally it is known from German patent specification No. 888,094 that higher olefins may be hydroformylated in two successive reaction stages with increasing temperature. Owing to the lack of longitudinal mixing, this method cannot however be used for hydroformylation mixing, this method cannot however be used for hydroformylation of propylene because of its high reaction speed and high heat effect per kilogram of olefin.

It is an object of this invention to provide an improved process for the production of butyraldehyde and butanols according to which a higher proportion of linear compounds is obtained. It is another object of the invention to provide an improved process according to which n-butyraldehyde and n-butanol are obtained in very good yields. It is a further object of the invention to provide an improved process according to which n-butyraldehyde and n-butanol are obtained in increased space-time yields.

In accordance with this invention the said objects and other objects are obtained according to the oxo process by reaction of propylene with carbon monoxide and hydrogen in the presence of 0.1 to 5 parts by weight of cobalt, in the form of carbonyl compounds, per 1000 parts by weight of propylene at pressures of from 50 to 500 atmospheres in two successive reaction stages at temperature of 120° to 150° C. in the first reaction stage and 155° to 200° C. in the second reaction stage, by means of an improvement which consists in maintaining a uniform or substantially uniform temperature at least in the first stage, the temperature difference within the stage being no more than 4° C.

Carbon monoxide and hydrogen may be used in ratio by volume of 5:1 to 1:5. It is advantageous to use a mixture of carbon monoxide and hydrogen in the ratio of about 1:1.

The propylene is advantageously used in the stoichiometric amount with reference to both carbon monoxide and hydrogen. It is also possible, however, to use propylene, carbon monoxide or hydrogen in an excess of for example up to 10 mole percent.

The catalytically active cobalt carbonyl compounds are best produced in the reaction mixture. For this purpose aqueous cobalt salt solutions, for example cobalt acetate, cobalt formate or cobalt butyrate, or cobalt soaps, for example cobalt oleate or cobalt naphthenate, in organic solvents, which may be the product or the propylene, may be added. Preformed cobalt carbonyl compounds, such as cobalt carbonyl hydride, may be introduced with the stream of synthesis gas or dissolved in organic solvents.

In general 0.1 to 5 parts by weight of cobalt in the form of carbonyl compounds is used for each 1000 parts by weight of propylene. Particularly good results are obtained when 0.5 to 3 parts by weight of cobalt in the form of carbonyl compounds is used for each 1000 parts by weight of propylene.

Temperatures of 120° to 150° C., preferably 130° to 145° C., are in general maintained in the first reaction stage, while the temperatures in the second reaction stage are usually 155° to 200° C., preferably 160° to 180° C.

The process may be carried out for example at pressures of from 50 to 500 atmospheres gauge. It is advantageous to use pressures of from 200 to 400 atmospheres gauge.

The reaction is carried out in two successive stages; more than 70%, advantageously about 75%, of the total conversion takes place in the first reaction stage in which a low temperature prevails, while the remainder is converted in the second stage at a higher temperature.

In the first reaction stage care should be taken by stirring means or baffles, such as circulation tubes or the like, or by other conventional means that the reaction mixture is mixed well so that a uniform temperature prevails in the whole of the reaction stage. The temperature difference, which is determined by measurement at various points in the reaction mixture, should advantageously be not more than 4° C., preferably less than 3° C., in particular less than 2° C. Provision may also be made for thorough mixing in the second reaction stage so that, as in the first stage, a uniform temperature is maintained in the reaction chamber. It is also possible however to allow the reaction medium simply to flow through the reaction chamber.

It is very advantageous for the cobalt salt solutions used to be supplied to the reactor in very finely divided form. The division may be so fine that the entire cobalt content of the aqueous solution has passed into the organic phase after one circulation.

The process according to the invention may be carried out for example by supplying the abovementioned catalyst, propylene and the mixture of carbon monoxide and hydrogen through one or more nozzles into a pressure reactor which is equipped with an internal circulation tube to produce circulation of the liquid. This is effected at such a high linear speed that a rapid circulation of liquid (and consequently a substantial uniformity of the temperature in the first stage) is achieved owing to the transfer of impulse and owing to the difference in density between the inner chamber and the outer chamber of the circulation tube. It is of advantage for the temperature difference to be less than 3° C., particularly less than 2° C. The reactor is filled to such an extent with reaction medium at the stated temperature that the circulation tube is flooded, the level being maintained by an overflow. The heat of reaction may be removed for example by indirect cooling or additionally by circulating the gaseous reactants and vaporization of the product and if necessary of water. The reaction mixture then passes into a second pressure reactor which may be provided, like the first, with baffles for thorough mixing of the contents or the reaction mixture may simply flow through the reactor. The reaction mixture then passes through a high-pressure cooler into a separator where the liquid is separated from the gas. Unreacted gas may be returned to the first reactor.

The oxo reaction mixture is then freed from cobalt by a conventional method. This may be effected for example by treatment with 0.5 to 5% by weight aqueous solutions of non-oxidizing mineral acids, such as hydrochloric acid or sulfuric acid. It is particularly advantageous for the oxo reaction mixture to be freed from cobalt by gassing it with air or other gas containing oxygen with an addition of 0.5 to 5 wt. percent aqueous acid, such as aqueous acetic acid, at 0° to 50° C. The reaction mixture freed from cobalt is then further processed by distillation in the usual way.

Normal-butyraldehyde may be used for the production of 2-ethylhexen-(2)-al-(4) (cf. U.S. patent specification No. 2,848,498).

The invention is further illustrated by the following example. Parts are by weight, unless otherwise stated. They bear the same relation to parts by volume as the kilogram to the liter.

EXAMPLE

Two series-connected vertical pressure tubes having capacities of 10.6 and 5.3 parts by volume respectively are used for the reaction. The first pressure tube contains a circulation tube which is completely submerged in the liquid phase during operation. The pressure tubes are provided with jackets for heating and cooling. 7500 parts by volume (STP) of carbon monoxide and hydrogen in the ratio of 1:1, 10.2 parts by volume of liquid propylene and 0.485 part by volume of aqueous cobalt acetate solution containing 2.4% by weight of cobalt are metered in per hour through nozzles at the bottom of the first pressure tube. A uniform temperature of 130° C.±1.5° C. is maintained in the first pressure tube, the temperature being determined at five measuring points, while an outlet temperature of 167° C. is set up in the second pressure tube. The discharged reaction mixture is separated from the gaseous constituents and then freed from cobalt by treatment with 3% by weight aqueous acetic acid at 30° C. while being aerated. 8.8 parts of oxo reaction product is obtained per hour. This is equivalent to a propylene conversion of 100%. The content of n-butyraldehyde and n-butanol in the crude reaction product is 78.6%.

We claim:
1. In a process for the production of butyraldehyde and butanol with a high proportion of linear compounds according to the oxo process in which propylene is reacted with carbon monoxide and hydrogen, wherein carbon monoxide and hydrogen are used in the ratio by volume of 5:1 to 1:5 in the presence of 0.1 to 5 parts by weight of cobalt for each 1000 parts by weight of propylene, the cobalt being in the form of a carbonyl compound, at pressures of 50 to 500 atmospheres in two successive reaction stages, the improvement which comprises: carrying out the reaction at temperatures of 120° to 150° C. in the first reaction stage and at temperatures of 155° to 200° C. in the second stage, maintaining in the first reaction stage a uniform temperature, the temperature difference within said stage being not more than 4° C. and converting more than 70% of the propylene in the first reaction stage.

2. A process as claimed in claim 1 wherein carbon monoxide and hydrogen are used in the ratio by volume of about 1:1.

3. A process as claimed in claim 1 wherein propylene is used in the stoichiometric amount with reference to the mixture of carbon monoxide and hydrogen.

4. A process as claimed in claim 1 wherein a pressure of 200 to 400 atmospheres is used.

5. A process as claimed in claim 1 wherein temperatures of from 130° to 145° C. are used in the first reaction stage and temperatures of 160° to 180° C. in the second reaction stage.

6. A process as claimed in claim 1 wherein a temperature difference of less than 3° C. is maintained in at least one reaction stage.

7. A process as claimed in claim 1 wherein a uniform temperature is maintained over the whole stage in both the first reaction stage and the second reaction stage.

References Cited

UNITED STATES PATENTS

| | | | |
|---|---|---|---|
| 3,271,458 | 9/1966 | Ellis et al. | 260—604 |
| 2,827,491 | 3/1958 | Mertzweiller | 260—604 |

OTHER REFERENCES

Hughes et al.: Industrial and Eng. Chem., vol. 49, 1957.

BERNARD HELFIN, Primary Examiner

R. H. LILES, Assistant Examiner

U.S. Cl. X.R.

260—632